United States Patent
Tezak et al.

(10) Patent No.: US 10,256,902 B2
(45) Date of Patent: Apr. 9, 2019

(54) DETECTING ERRORS IN OPTICAL MESSAGES

(71) Applicant: Hewlett Packard Enterprise Development LP, Houston, TX (US)

(72) Inventors: Nikolas Anton Tezak, Palo Alto, CA (US); David Kielpinski, Palo Alto, CA (US); Jason Pelc, Palo Alto, CA (US); Thomas Van Vaerenbergh, Palo Alto, CA (US); Ranojoy Bose, Palo Alto, CA (US); Raymond G. Beausoleil, Seattle, WA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/775,497

(22) PCT Filed: Nov. 13, 2015

(86) PCT No.: PCT/US2015/060695
§ 371 (c)(1),
(2) Date: May 11, 2018

(87) PCT Pub. No.: WO2017/082932
PCT Pub. Date: May 18, 2017

(65) Prior Publication Data
US 2018/0323869 A1 Nov. 8, 2018

(51) Int. Cl.
| | | |
|---|---|---|
| H04L 1/20 | (2006.01) | |
| G02B 6/293 | (2006.01) | |
| H04B 10/67 | (2013.01) | |
| H04B 10/079 | (2013.01) | |
| H04L 1/00 | (2006.01) | |

(52) U.S. Cl.
CPC ... *H04B 10/07953* (2013.01); *G02B 6/29331* (2013.01); *H04B 10/67* (2013.01); *H04L 1/00* (2013.01); *H04L 1/20* (2013.01)

(58) Field of Classification Search
None
See application file for complete search history.

(56) References Cited

U.S. PATENT DOCUMENTS

| | | |
|---|---|---|
| 7,053,359 B2 | 5/2006 | Ponomarenko |
| 2002/0015554 A1 | 2/2002 | Oguma et al. |

(Continued)

FOREIGN PATENT DOCUMENTS

| | | |
|---|---|---|
| EP | 0629896 | 10/2001 |
| EP | 1411642 A1 | 4/2004 |

(Continued)

OTHER PUBLICATIONS

Rakshit et al, "Design of micro-ring resonator based all-optical parity generator and checker circuit" (published in Elsevier Optical Communications, vol. 303, pp. 30-37, Apr. 2013).*

(Continued)

*Primary Examiner* — Casey L Kretzer
(74) *Attorney, Agent, or Firm* — Tong, Rea, Bentley & Kim, LLC

(57) ABSTRACT

In example implementations, an apparatus includes a bus waveguide, a plurality of optical gates coupled to the bus waveguide and an injection coupler. The bus waveguide receives a plurality of constraint signals. Each optical gate outputs an internal state via a local phase shift when at least one of the plurality of constraint signals has a wavelength that matches a respective resonant wavelength. The injection coupler combines the at least one of the plurality of constraint signals with additional constraint signals that are injected. An error is detected in a bit of a message when an overall phase shift has occurred to the at least one of the plurality of constraint signals causing a power level to exceed a power level threshold of an optical gate when the at least one of the plurality of constraint signals constructively interferes with the additional constraint signals that are injected.

15 Claims, 4 Drawing Sheets

(56) References Cited

U.S. PATENT DOCUMENTS

| | | |
|---|---|---|
| 2010/0189441 A1 | 7/2010 | Bolla et al. |
| 2013/0294782 A1 | 11/2013 | Liboiron-Ladouceur et al. |
| 2014/0101512 A1 | 4/2014 | Djordjevic et al. |
| 2014/0317477 A1 | 10/2014 | Chang et al. |

FOREIGN PATENT DOCUMENTS

| | | |
|---|---|---|
| WO | WO-2010025256 | 3/2010 |
| WO | WO-2010103481 | 9/2010 |

OTHER PUBLICATIONS

Djordjevic, I.B, et al., "Advanced Schemes for All-optical Computing, Optical Error Correction, and Optical Signal Processing," (Research Paper), Jul. 5-9, 2015, 6 pages.

Vasic, B. et al., "Low-density Parity Check Codes and Iterative Decoding for Long-haul Optical Communication Systems," (Research Paper), Feb. 2003, 9 pages.

PCT International Search Report cited in Appl. No. PCT/US2015/060695 dated Aug. 9, 2016; 3 pages.

Sipser, M., & Spielman, D. A. (1994). Expander codes. In Proceedings 35th Annual Symposium on Foundations of Computer Science (vol. 42, pp. 566-576).

Pavlichin, D. S., & Mabuchi, H. (2014). Photonic circuits for iterative decoding of a class of low-density parity-check codes. New Journal of Physics, 16(10), 105017.

Mellanox Technologies. (2011). FDR InfiniBand is Here.

International Preliminary Report on Patentability received for PCT Patent Application No. PCT/US2015/060695, dated May 24, 2018, 7 pages.

* cited by examiner

DETECTING ERRORS IN OPTICAL MESSAGES

STATEMENT OF GOVERNMENT INTEREST

This invention was made with government support under Contract No. N66001-12-2-4007, awarded by Defense Advanced Research Projects Agency. The government has certain rights in this invention.

BACKGROUND

Optical communication is the leading solution for high speed, high bandwidth exchange of digital information. Optical communications transmit information over long distances using light signals over light transmitting mediums, such as optical fibers and waveguides.

Information can be carried by the light signals using different types of light sources as optical transmitters (e.g., light emitting diodes (LEDs), infrared light, lasers, and the like). A light signal can be encoded using different types of modulation schemes to vary the optical phase or intensity of the light signal.

DETAILED DESCRIPTION

Figure 1:
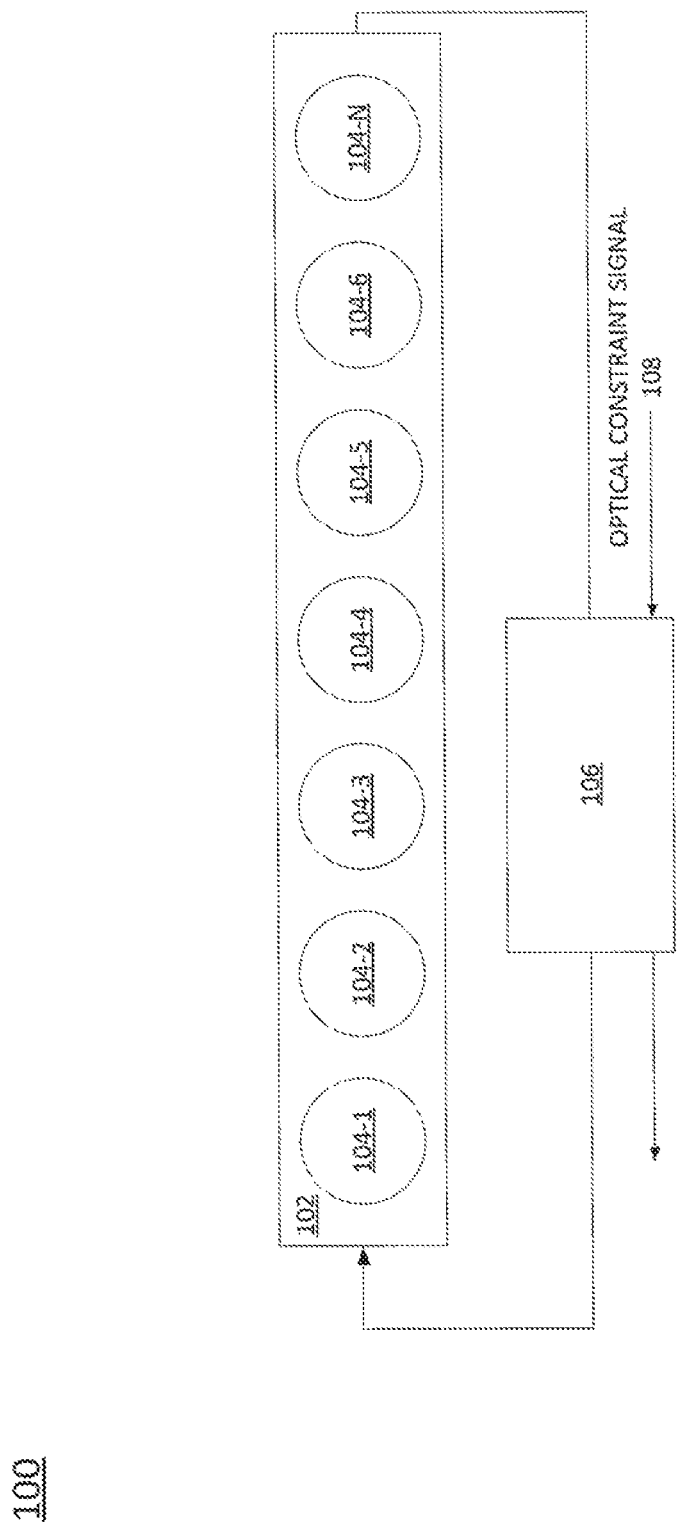
FIG. 1 is a block diagram of an example apparatus of the present disclosure.

The present disclosure discloses systems and techniques for providing an all optical error detecting and correcting solution for information encoded in an optical data package. The error detection and correction can occur even with a plurality of different wavelengths being transmitted within the same system.

As discussed above, optical communication systems transmit information over long distances using light signals over light transmitting mediums, such as waveguides. Information can be carried by the light signals using different types of light sources as optical transmitters. The information can be encoded using different types of modulation schemes to vary the intensity or optical phase of the light signal.

Optical phase may be defined relative to that of a stable reference signal of the same frequency and can take on values between 0 and $2\pi$. Phase values outside that interval can be identified with their value modulo $2\pi$.

Two optical signals of the same wavelength and comparable power interfere constructively when they have a similar optical phase. Two optical signals of the same wavelength and comparable power interfere destructively when their relative optical phase is approximately $\pi$.

Current solutions for optical and electronic communication transmit a whole data package, i.e., a fixed length sequence of many bits, at once. However, errors can occur within the package. Current solutions use a high optical power or a lower modulation rate in order to achieve a high signal to noise ratio (SNR), or equivalently a low bit-error rate (BER). Current solutions use the entire data package to be fully re-transmitted when an error is detected, which incurs a high latency penalty.

In addition, the error processing is carried out electronically, which may use latency and energy-intensive conversion from optical signals to electrical signals and back. As a consequence, current optical communications technology implements electrical error correction technologies that use a high amount of energy.

The present disclosure, provides an all optical solution to detecting and correcting errors in optical data packages transmitted over light signals. The techniques described by the present disclosure may use existing optical communication schemes such as wavelength division multiplexing (WDM). As a result additional wavelength conversions, which can be expensive, are eliminated. The WDM scheme also enables sharing waveguides and gates in the circuit between different optical modes.

In one example, the examples of the present disclosure leverage the coding schemes associated with linear block codes. In one example, the methods associated with low density parity check (LDPC) codes may be leveraged by the all optical solution to provide autonomous error detection and correction. An example for a linear block code is given by a Hamming (7,4) code. A review of the Hamming (7,4) methods may provide the reader some background in the coding theories implemented by the all optical solutions described herein. In addition, a review of LDPC's, and specifically their subclass named "Expander Codes," may provide the reader some background with the iterative message passing based decoding scheme that is implemented by the apparatus and systems described herein.

A linear block code is fully described by a binary parity check matrix H. A data package "x" can be checked for errors by computing the error syndrome c=Hx(modulo 2). When any bit in c is non-zero, an error has occurred.

FIG. 1 illustrates an example apparatus 100 of the present disclosure. The apparatus 100 may include a bus waveguide 102, a plurality of optical gates 104-1 to 104-$n$ (herein also referred to individually as an optical gate 104 or collectively as optical gates 104), and an injection coupler 106. The bus waveguide 102 may either wrap around into a closed loop or have a reflective end to form a large optical resonator around the optical gates 104.

In one implementation, the optical gates 104 may be deployed, or arranged, to implement a decoding scheme associated with a linear block code. In one example, the linear block code may be an LDPC coding scheme.

Each optical gate 104 stores one bit of the optical data package. In one example, the optical data package may include the message represented in coding theory terms. The initial state of the optical gate 104 may be initialized in various ways depending on the application and how the optical gate 104 is actually implemented.

The optical gates 104 may interact with a set of constraint signals 108 of different wavelengths that propagate in the bus waveguide 102. The constraint signals 108 may be optical signals that are coupled into the bus waveguide 102 via the injection coupler 106 to provide an all optical solution to autonomously detect and correct bit errors in a message. In other words, the bit errors can be detected and corrected in the optical data package without converting the optical data package to an electrical signal and back to the optical data package.

In one example, there may be one constraint signal 108 with a separate optical wavelength per parity check for the LDPC. Each constraint signal 108 may be initially injected with a comparable input power.

In one implementation, the apparatus 100 may determine an error has occurred in a bit whenever at least one constraint signal 108 picks up a particular total phase shift after travelling through the optical gates 104 and the bus waveguide 102.

For example, if a constraint signal 108 of a fixed wavelength enters the bus waveguide 102 at the injection coupler 106 with a phase of 0 and returns to the injection coupler 106 with a total roundtrip phase of 0, then it may be determined that a bit error has occurred in the message.

For each constraint signal 108, an optical roundtrip phase of 0 indicates that at least one of the data bits participating in that constraint signal 108 has an error. For each constraint signal 108, the constraint bit may be defined to be 1 when the roundtrip phase is 0 and the constraint bit may be defined to be 0 if the roundtrip phase is $\pi$.

The full set of constraint bits gives the error syndrome. When all constraint bits equal 0, the input data encoded in the optical gates 104 is in a valid codeword.

For each possible error syndrome that contains non-zero bits, there is a most likely valid codeword. The system may be designed such that bit errors are corrected and the bit sequence of the optical gates 104 converges to the most likely valid codeword.

When a constraint signal 108 has a roundtrip phase of 0, the constraint signal 108 may constructively interfere with another injected constraint signal 108 at the injection coupler 106. This may lead to a buildup of optical power at that particular wavelength traveling around the bus waveguide 102.

The locations of bits that have a high probability of an error may be determined autonomously by the optical gates 104. Those optical gates 104 that receive power from their resonant constraint modes in excess of a respective power level threshold are likely to contain an error. For example, each separate wavelength may correspond to one constraint $c_j$ for the code word of the LDPC coding scheme, as discussed below with reference to FIG. 2. When a bit error occurs at an optical gate 104, each constraint signal 108 associated with the optical gate 104 may be in an error state causing the power level threshold of the optical gate 104 to be exceeded. This may cause the optical gate 104 to switch the respective internal state, which changes the roundtrip phase of its resonant constraint signals 108, which leads to destructive interference at the injection coupler 106, which reduces the total power level of the optical gate 104.

The message may be automatically corrected as the apparatus 100 continues to operate until a total power level of the apparatus 100 reaches a steady state or equilibrium. In other words, the bit value stored at each one of the optical gates 104 when the total power level of the apparatus 100 reaches the steady state may be the corrected bit values for a message that is encoded in the initial state of the optical gates 104.

Figure 2:
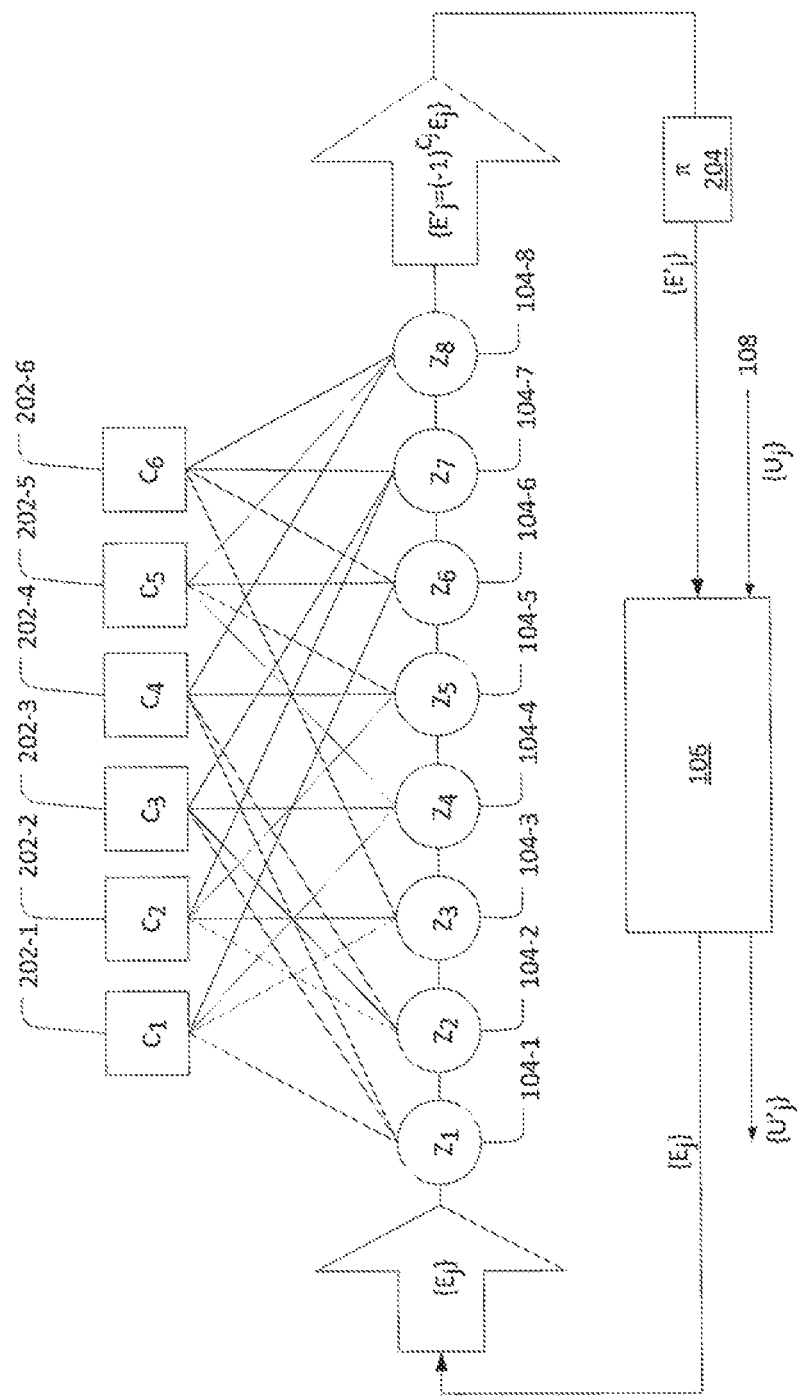
FIG. 2 is a diagram of an example operation of the apparatus.

FIG. 2 illustrates an example of the apparatus 100 that implements a coding scheme that uses six constraints 202-1 to 202-6 (herein referred to individually as a constraint 202 or collectively as constraints 202) also labeled as boxes c1 to c6. In one implementation, the plurality of optical gates 104 may be illustrated as nodes Z1 to Z8. FIG. 2 illustrates an example implementation using eight optical gates 104-1 to 104-8 (herein referred to individually as an optical gate 104 or collectively as an optical gates 104).

In one implementation, the optical gates 104 may be deployed to operate on the constraint signals 108 as desired. For example, the optical gates 104 may have at least one physical input coupler and at least one physical output coupler through which the constraint signals 108 can enter and exit the optical gates 104. The input and output coupler can be realized through the same physical element.

The optical gates 104 may interact with a particular set of resonant optical wavelengths. For example, each one of the constraints 202-1 to 202-6 may have a wavelength that is associated with a subset of the optical gates 104-1 to 104-8. For example, the wavelength associated with the constraint 202-1 may be a resonant wavelength for the optical gates 104-1, 104-3, 104-4, 104-6 and 104-7. The wavelength associated with the constraint 202-2 may be a resonant wavelength for the optical gates 104-2, 104-3, 104-5 and 104-7. The association between the remaining constraints 202-3 to 202-6 and the optical gates 104-1 to 104-8 is illustrated in FIG. 2 by the lines or edges that are drawn between them.

The optical gates 104 may not couple to a constraint signal 108 that is not at one of the resonant wavelengths. In other words, the constraint signals 108 that are off-resonant may simply pass through the optical gates 104 unaltered or with a constant phase shift $\alpha$ (ideally $\alpha$=0).

When the total incident optical power is below a power threshold level of the optical gates 104, the optical gates 104 have at least two stable internal states $x \in \{0,1\}$. As a result, the optical gates 104 can carry a bit of information. The internal state $x \in \{0,1\}$ can be deterministically set through particular combinations of input signals. The internal state $x \in \{0,1\}$ can be read out continuously or when the optical gates 104 inputs are in a particular readout-configuration.

When the total incident optical power in resonant constraint modes is below the power threshold level, the optical gates 104 operate on the constraint signals 108 that are resonant by modifying the optical phase $\varphi$ of the constraint signals 108 conditional on its internal state x as $\varphi \rightarrow x\pi + \beta B$. In other words, when the stored bit is x=0, the optical phase is unaltered except for a state independent phase shift $\beta$ (ideally $\beta$=0), and when the stored bit is x=1, the optical phase receives an additional $\pi$ phase shift relative to the x=0 case.

When the total incident optical power is at or above the power threshold level, the internal bit state x can become undefined until the total power is lowered again, at which point it randomly becomes either 0 or 1. Alternatively, the internal bit state x can switch deterministically to the logical inverse of the current state $x_k \rightarrow \neg x_k$, where k=1 to N, for N bits.

The optical gates 104 may be realized by exploiting any dispersive non-linearity that works across different wavelengths such as the optical Kerr-effect, Free-carrier dispersion, or the thereto-optic effect. The selective wavelength sensitivity used to interact with a subset of the constraint signals 108 can be achieved by employing resonant structures. With these basic ingredients, engineering a bi-stable optical system that shifts a subset of passing wavelengths by a conditional phase shift of $\pi$ or 0 may be implemented.

The remaining problem may be how to ensure that the optical gate 104 switches its internal state independently of the previous state above a certain total incident power. There are several ways to achieve this, but one example may be to add additional non-linear elements implementing all-optical logic. Another approach, with potentially smaller hardware overhead may be to start from one such bi-stable device, duplicate it, and connect both together in such a way that the two bi-stable devices will always assume the opposite internal state. If implemented correctly, the symmetry of this construction may realize the desired bifurcation behavior at the threshold power.

Given these properties of the optical gates 104, the constraint signal or signals 108 may propagate through the bus waveguide 102. Whenever the constraint signal 108 passes through an optical gate 104 that has an associated resonant wavelength that is equal to the wavelength of the constraint signal 108, the constraint signal 108 picks up a state dependent phase shift $E_j \to E_j \ e^{i(x_k \pi + \beta)} = E_j \ (-1)^{x_k} e^{i\beta}$, where e is Euler's number, j=1 to N-M where M is a number of actual bits of a message encoded into N bits and the values $x_k$ and $\beta$ are defined above.

It should be noted that a single phase shift $\pi$ corresponds to multiplication by a factor of (−1). The resonance wavelengths of the optical gates 104 may be designed such that an optical gate 104 is resonant with a wavelength of the constraint signal 108 if $H_{jk}=1$, where $H_{jk}$ is a binary valued parity check matrix of the LDPC. The matrix $H_{jk}$ may specify which bits participate in which constraints as represented by the example associations drawn in FIG. 2 between the constraints 202-1 to 202-6 and the optical gates 104-1 to 104-8. In other words, the matrix $H_{jk}$ may be used to pre-define the resonant wavelengths associated with each one of the optical gates 104.

After a full roundtrip inside of the bus waveguide 102, the constraint signal 108 may arrive at the injection coupler 106 as $E_j \to \eta E_j \ (-1)^{c_j}$, where the exponent of (−1) equals the constraint checksum $c_j = \Sigma_{k=1}^{N} H_{jk} x_k$ and $0 < \eta \leq 1$ is a constant attenuation factor (ideally $\eta=1$).

Before arriving at the injection coupler 106, the constraint signal 108 may go through a final phase shifter 204 to compensate all state independent phase shifts from the optical gates 104. In addition, the final phase shifter 204 may be used to enforce that constraint modes corresponding to an error build up power through constructive interference. In one example, the final phase shifter 204 may apply a phase shift of n to all constraint signals 108 that pass through the bus waveguide 102. The final phase shifter 204 may ensure that the constraint signal 108 destructively interferes with input constraint signals 108 at the injection coupler 106 when the overall phase shift is 0 indicating no error. Alternatively, the final phase shifter 204 may ensure that the constraint signal 108 constructively interferes with the input constraint signals 108 at the injection coupler 106 when the overall phase shift is $\pi$ indicating an error has occurred.

At the injection point, the returned constraint signal 108 may interfere with the amplitudes of additional constraint signals 108 being injected at the injection point such that in equilibrium (e.g., achieved after a few round trips) the amplitudes of the constraint signals 108 inside the bus waveguide 102 satisfy $E_j = \sqrt{1-t^2} U_j - t \ \eta E_j \ (-1)^{c_j}$, t is the amplitude transmissivity and is $0 < t < 1$. The amplitude transmissivity t may characterize the transmission through the injection coupler 106 and the external signal injection amplitude $U_j$.

The injection coupler 106 may be designed to have the amplitude transmissivity to be very close to 1. This may imply that solving for $E_j$ may lead to different signal mode amplitudes $E_j$ conditional on the constraint value $c_j$ given by the Equations below:

$$E_j = \frac{\sqrt{1-t^2}}{1+t\eta(-1)^{c_j}} U_j \approx \begin{cases} \frac{1}{1+t\eta} U_j \text{ for } c_j \equiv 0 \ (\text{mod } 2) \\ \frac{1}{1-t\eta} U_j \text{ for } c_j \equiv 1 \ (\text{mod } 2) \end{cases}$$

for high transmissivity and small roundtrip losses $0 \leq 1 - t\eta \ll 1$. Thus, the signal mode for a violated constraint $c_j=1$ builds up far more power inside the bus waveguide 102 than for a satisfied constraint $c_j=0$ by a factor of $$\frac{E_j^2(c_j = 1)}{E_j^2(c_j = 0)} = \left(\frac{1+t\eta}{1-t\eta}\right)^2 \gg 1.$$

This may happen simultaneously for all constraint signals 108.

For a given optical gate 104 whose bit state has been corrupted due to a transmission error, with high likelihood most of the constraints (e.g., parity checksums) that that the optical gate 104 participates in, will indicate an error $c_j=1$ The optical gates 104 may be resonant with a different subset of resonant wavelengths of the constraint signals 108. Thus, the optical gates 104 with corrupted bits will, with a high likelihood, be resonant with the largest number of constraint signals 108 in the error state. Therefore, the optical gates 104 that contain corrupted bits may receive coherent feedback in the form of higher optical input power, driving them to reach the respective power threshold level and switch the respective internal state. When this happens for a given optical gate 104, all constraint modes resonant with that optical gate 104 will flip the respective optical phase and, thus, change the respective power level.

Constraint checksums may be computed by the constraint signals 108 that pick up a total phase shift around the bus waveguide 102. Message bits stored in an optical gate 104 may be induced to switch when many of the constraints associated with one of the optical gates 104 cause the optical gate 104 to build up power due to being in the error state, as described above.

In equilibrium, the transmitted external injection amplitudes $U_j'$ may be given by the equation below:

$$U_j' = \left(\frac{t + \eta(-1)^{c_j}}{1 + t\eta(-1)^{c_j}}\right) U_j$$

If the transmissivity is matched to be equal to the internal roundtrip attenuation (e.g., $t=\eta$), then the transmitted injection amplitude may vanish, while the constraint is violated. By monitoring the total transmitted power level $P' \propto \Sigma_{j=1}^{N-M} |U'U_j'|^2$, it can be determined when the apparatus 100 has converged. The stored bit value of each gate 104 when the apparatus 100 has converged represent the correct bit value for each bit of the data package.

Figure 3:
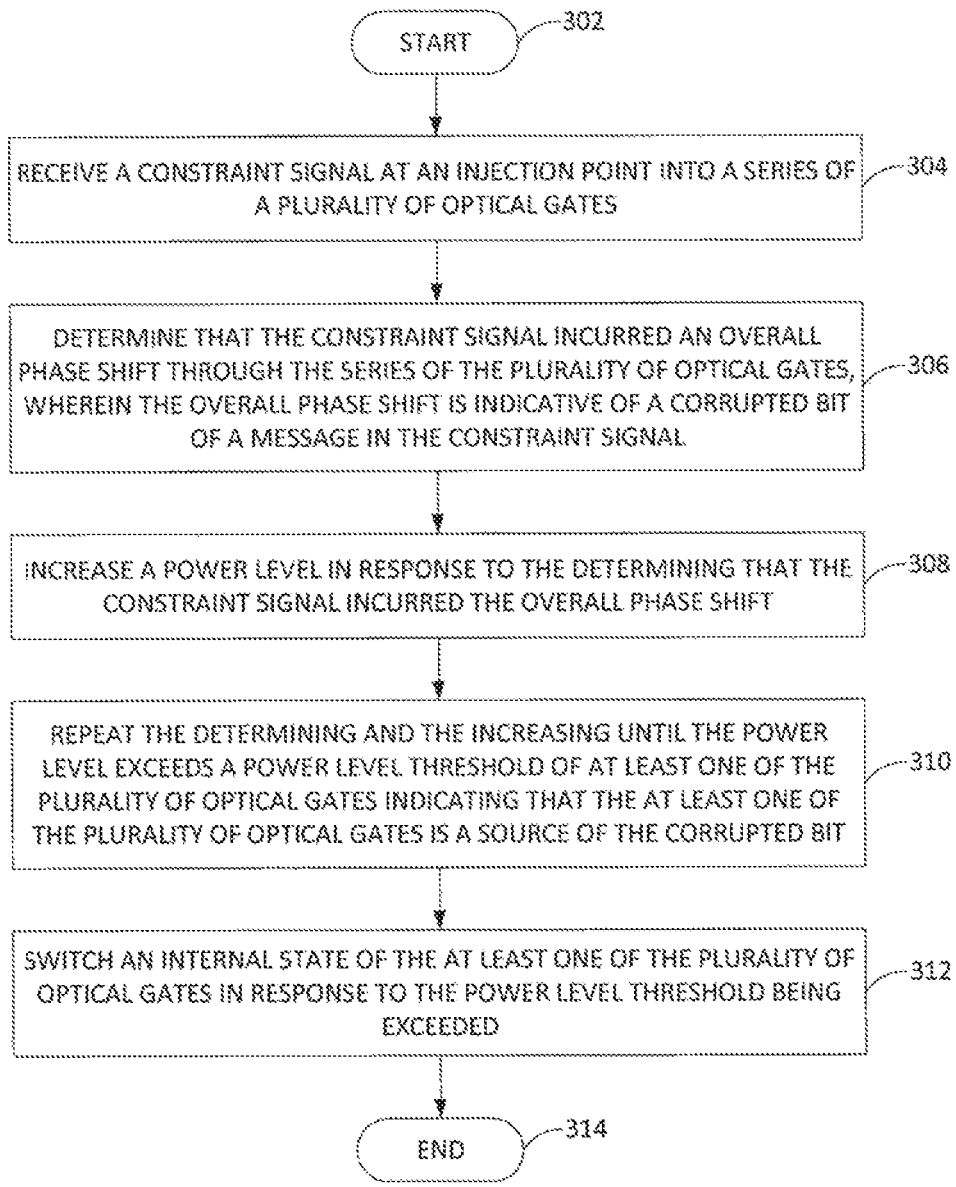
FIG. 3 is a flow diagram of an example method for detecting an error in an optical data package.

FIG. 3 illustrates a flow diagram of an example method 300 for detecting an error in an optical data package. In one example, the blocks of the method 300 may be performed by the apparatus 100.

At block 302, the method 300 begins. At block 304, the method 300 receives a constraint signal at an injection point into a series of a plurality of optical gates. In one example, the constraint signal may comprise a plurality of constraint signals having an equivalent input power level, but different wavelengths.

In one example, the optical gates may be arranged to implement a linear block code coding scheme (e.g., an LDPC coding scheme). The number of optical gates that are deployed may be equal to a total number of bits in the data package (e.g., actual message bits plus redundant bits used to implement the coding scheme).

As described above, each one of the optical gates may store a binary bit value of 0 or 1. The bit value that is stored may be read out by the constraint signal as a phase shift. For example, a value of 0 may be read out when no phase shift is applied and a value of 1 may be read out when a phase shift is applied.

A phase shift may be applied when a wavelength of the constraint signal matches a resonant wavelength of an optical gate. For example, each optical gate may be associated with a plurality of resonant wavelengths. Said another way, a plurality of different subsets of optical gates may be selected for each constraint of a respective check sum. The plurality of resonant wavelengths associated with each optical gate may be predetermined based on binary parity check sum constraints that are associated with each one of the optical gates (e.g., the binary values of the matrix H described above).

At block 306, the method 300 determines that the constraint signal incurred an overall phase shift through the series of the plurality of optical gates, wherein the overall phase shift is indicative of a corrupted bit of a message. For example, for a particular constraint signal, the overall phase shift should be zero when travelling through the series of optical gates. For example, the optical signal may begin with a phase of 0 or $2\pi$. A first optical gate may apply a phase shift of $\pi$, a second optical gate may apply a phase shift of $\pi$ and a third optical gate may apply no phase shift. Thus, the constraint signal has no error since the overall phase shift is 0. However, to ensure that the constraint signal destructively interferes with input constraint signals at the injection coupler, a final phase shifter may apply a global phase shift of $\pi$. Thus, the constraint signal begins with a phase of 0 and returns to the injection coupler with a phase of $\pi$. Thus, no constructive interference occurs and the power level of the constraint signal is decreased in the next roundtrip.

However, if the constraint signal incurs an overall phase shift of $\pi$ from the optical gates and returns to the injection coupler with a phase of 0 after the final phase shifter is applied, then an error has occurred. The method 400 discussed below may determine that a bit of the message is corrupted.

At block 308, the method 300 increases a power level in response to the determining that the constraint signal incurred the overall phase shift. For example, when the constraint signal arrives at the injection coupler with a phase shift of 0 (e.g., an overall phase shift of $\pi$ plus a final phase shift of $\pi$ that is applied to all constraint signals), the constraint signal may interfere constructively at an injection coupler with input constraint signals that are being injected into the bus waveguide. Thus, the returning phase shifted constraint signal when interfered with the other constraint signals may cause the overall or total power of the system to increase.

At block 310, the method 300 repeats the determining and the increasing until the power level exceeds a power level threshold of at least one of the plurality of optical gates indicating that the at least one of the plurality of optical gates is a source of the corrupted bit. For example, when the block 306 and the block 308 are repeated, the total power of the system may increase until it exceeds the power level threshold of one of the optical gates. The optical gate that has a total power level that exceeds the respective power level threshold may be identified as the bit that has the error or is storing the corrupted bit.

At block 312, the method 300 switches an internal state of the at least one of the plurality of optical gates in response to the power level threshold being exceeded. For example, if the value of the optical gate that is causing the bit error is 1, the value may be switched to 0 to reduce the total power level back below the power level threshold.

In one example, the value may be switched deterministically or may be switched randomly. In one example, the determining, the increasing, the repeating and the switching in blocks 306, 308, 310 and 312, respectively, may be repeated until the total power level reaches a steady state. The values stored in each one of the optical gates when the total power level reaches the steady state may be the value associated with each bit of the message. At block 314, the method 300 ends.

Figure 4:
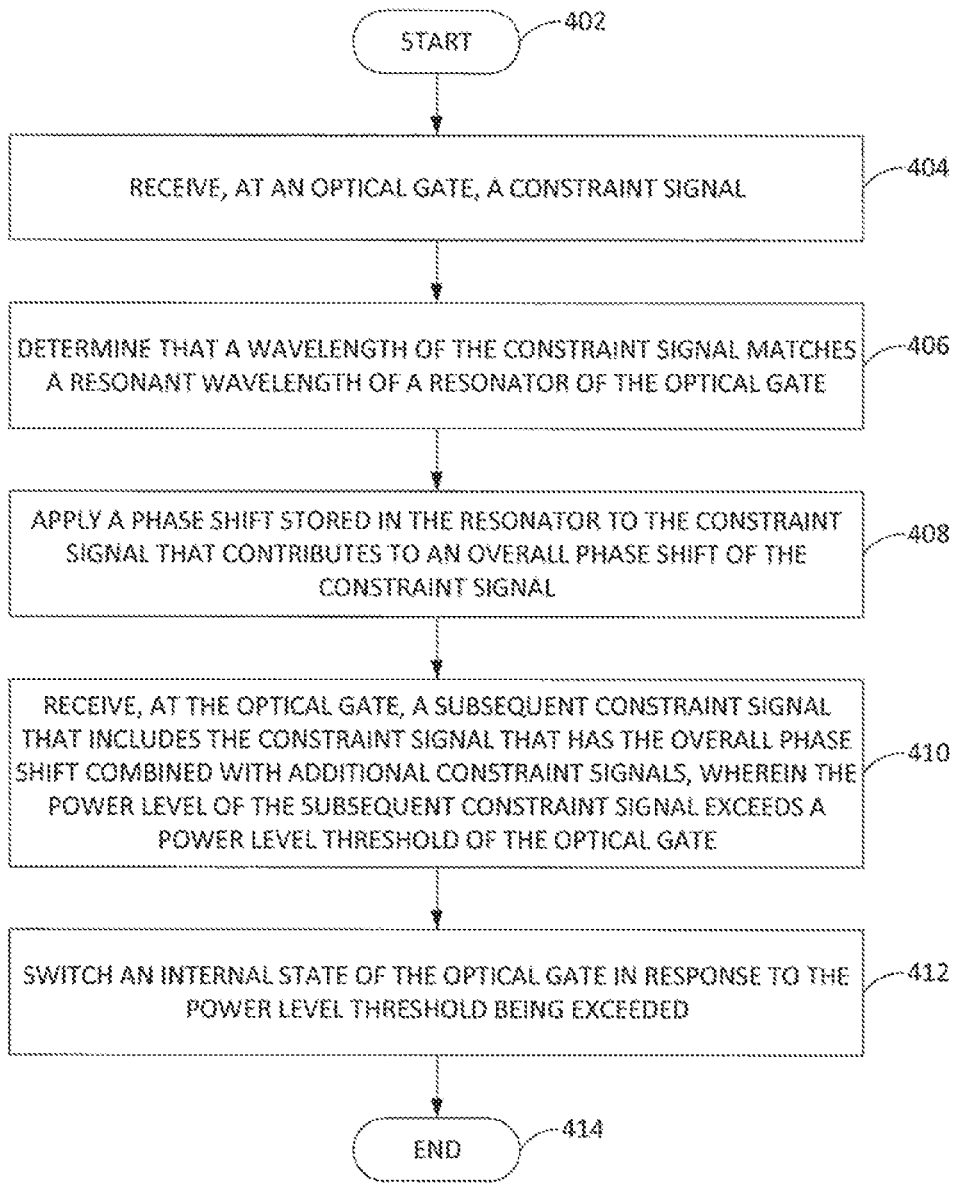
FIG. 4 is a flow diagram of another example method for detecting an error in an optical data package.

FIG. 4 illustrates a flow diagram of an example method 400 for detecting an error in an optical data package. In one example, the blocks of the method 400 may be performed by one of the optical gates 104.

At block 402, the method 400 begins. At block 404, the method 400 receives, at an optical gate, a constraint signal. In one example, the constraint signal may be one of a plurality of constraint signals that is received. The plurality of constraint signals may have an equivalent power level, but different wavelengths.

In one example, the optical gate may be arranged to implement a linear block code coding scheme (e.g., an LDPC coding scheme). The number of optical gates that are deployed may be equal to a number of bits (e.g., actual message bits plus redundant bits used to implement the coding scheme).

At block 406, the method 400 determines that a wavelength of the constraint signal matches a resonant wavelength of a resonator of the optical gate. In one example, the resonant wavelength of the resonator may be selected based on participation of the bit value stored in an optical gate with an associated constraint of a respective check sum.

At block 408, the method 400 may apply a phase shift stored in the resonator to the constraint signal that contributes to an overall phase shift of the constraint signal. The phase shift imparted by the optical gate on a constraint signal that is resonant may be representative of a binary bit value of 0 or 1 that is stored in the optical gate. The bit value that is stored may be read out by the constraint signal as a phase shift. For example, a value of 0 may be read out when no phase shift is applied and a value of 1 may be read out when a phase shift is applied.

An overall phase shift from all optical gates is indicative of a corrupted bit of a message. For example, for a particular constraint signal, the overall phase shift should be zero after travelling through the series of optical gates, or equivalently it after passing through the final phase shifter. For example, the optical signal may begin with a phase of 0 or $2\pi$. A first optical gate may apply a phase shift of it, a second optical gate may apply a phase shift of it and a third optical gate may apply no phase shift. Thus, the optical signal begins with a phase of 0 and passes through the optical gates with an overall phase shift of 0, but then passes through the final phase shifter and arrives back at the injection coupler with a phase of $\pi$. Thus, the constraint signal destructively interferes with input constraint signals at the injection coupler.

However, if the constraint signal receives an overall phase shift of it after passing through the optical gates 104 and the bus waveguide 102, the final phase shifter may apply a phase shift of $\pi$. As a result, the constraint signal returns to an injection coupler with a phase of 0 and interferes constructively with the input constraint signal to increase the power in the constraint signal indicating a bit of the message is corrupted.

At block 410, the method 400 receives, at the optical gate, a subsequent constraint signal that includes the constraint signal that has the overall phase shift combined with additional constraint signals, wherein the power level of the subsequent constraint signal exceeds a power level threshold of the optical gate. For example, when the constraint signal arrives at the injection coupler with a phase shift of 0 (e.g., an overall phase shift of π plus a final phase shift of π that is applied to all constraint signals), the constraint signal may interfere constructively at an injection coupler with input constraint signals that are being injected into the bus waveguide. The phase shifted constraint signal when combined with the other constraint signals may cause the overall or total power of the system to increase.

At block 412, the method 400 switches an internal state of the optical gate in response to the power level threshold being exceeded. For example, if the value of the optical gate that is causing the bit error is 1, the value may be switched to 0 to reduce the total power level back below the power level threshold.

In one example, the value may be switched deterministically or may be switched randomly. In one example, the blocks 404-412 may be repeated until the total power level reaches a steady state.

In one implementation, the method 400 may be performed by each one of a plurality of optical gates connected within a bus waveguide. The values stored in each one of the optical gates when the total power level reaches the steady state may be the value associated with each bit of the message. At block 414, the method 400 ends.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An apparatus comprising:
a bus waveguide, wherein the bus waveguide receives a plurality of constraint signals at an injection point;
a plurality of optical gates coupled to the bus waveguide, wherein each optical gate of the plurality of optical gates outputs an internal state via a local phase shift when at least one of the plurality of constraint signals has a wavelength that matches a respective resonant wavelength of the each optical gate of the plurality of optical gates; and
an injection coupler to combine the at least one of the plurality of constraint signals with additional constraint signals that are injected into the bus waveguide, wherein an error is detected in a bit of a message when an overall phase shift has occurred to the at least one of the plurality of constraint signals traveling through the plurality of optical gates and the bus waveguide, causing a power level to exceed a power level threshold of an optical gate of the plurality of optical gates when the at least one of the plurality of constraint signals constructively interferes with the additional constraint signals that are injected.

2. The apparatus of claim 1,
wherein the power level exceeding the power level threshold of the optical gate of the plurality of optical gates identifies the optical gate as causing the overall phase shift and switches the internal state of the optical gate in response to the power level threshold being exceeded.

3. The apparatus of claim 1, wherein a plurality of different subsets of optical gates of the plurality of optical gates is selected for each constraint of a respective check sum.

4. The apparatus of claim 1,
wherein the internal state is stored in a resonator in each one of the plurality of optical gates and the internal state is associated with a bit value of the message associated with a respective one of the plurality of constraint signals.

5. The apparatus of claim 1,
wherein the plurality of constraint signals comprise different wavelengths.

6. The apparatus of claim 1, wherein the optical gate that caused the overall phase shift is identified as a location of a bit error.

7. The apparatus of claim 1, wherein correct message bits of the message are represented by the internal state of each one of the plurality of optical gates when a power level of the apparatus reaches a steady state.

8. A method comprising:
receiving a constraint signal at an injection point into a series of a plurality of optical gates;
determining that the constraint signal incurred an overall phase shift through the series of the plurality of optical gates, wherein the overall phase shift is indicative of a corrupted bit of a message;
increasing a power level in response to the determining that the constraint signal incurred the overall phase shift via constructive interference with an additional signal;
repeating the determining and the increasing until the power level exceeds a power level threshold of at least one of the plurality of optical gates indicating that the at least one of the plurality of optical gates is a source of the corrupted bit; and
switching an internal state of the at least one of the plurality of optical gates in response to the power level threshold being exceeded.

9. The method of claim 8, comprising:
repeating the determining, the increasing, the repeating and the switching until the power level reaches a steady state.

10. The method of claim 9, wherein a respective internal state of each one of the plurality of optical gates at the steady state is a respective bit value of the message.

11. The method of claim 8, wherein the receiving at the injection point comprises receiving a plurality of constraint signals of different wavelengths.

12. The method of claim 8, comprising:
applying a local phase shift by a respective one of the plurality of optical gates when a wavelength of the constraint signal matches a resonant wavelength of the respective one of the plurality of optical gates.

13. The method of claim 8, comprising:
applying a final phase shift to the constraint signal such that the constraint signal has a phase of 0, causing the constraint signal to constructively interfere with additional constraint signals that are injected, thereby causing the power level to increase.

14. A method comprising:
receiving, at an optical gate, a constraint signal;
determining that a wavelength of the constraint signal matches a resonant wavelength of a resonator of the optical gate;
applying a phase shift stored in the resonator to the constraint signal that contributes to an overall phase shift of the constraint signal;
receiving, at the optical gate, a subsequent constraint signal that includes the constraint signal that constructively interferes with additional constraint signals, wherein a power level of the subsequent constraint signal exceeds a power level threshold of the optical gate indicating an error in the constraint signal; and
switching an internal state of the optical gate in response to the power level threshold being exceeded.

15. The method of claim 14, wherein the resonant wavelength of the resonator is selected based on participation of a bit value stored in the optical gate with an associated constraint of a respective check sum.

* * * * *